United States Patent
Langoulant et al.

(10) Patent No.: US 9,524,568 B2
(45) Date of Patent: Dec. 20, 2016

(54) MOVEMENT OF POSITION INDICATOR ON TOUCHSCREEN

(71) Applicant: Apple Inc., Cupertino, CA (US)

(72) Inventors: Brendan J. Langoulant, San Francisco, CA (US); Joshua H. Shaffer, San Jose, CA (US)

(73) Assignee: APPLE INC., Cupertino, CA (US)

( * ) Notice: Subject to any disclaimer, the term of this patent is extended or adjusted under 35 U.S.C. 154(b) by 366 days.

(21) Appl. No.: 14/069,858

(22) Filed: Nov. 1, 2013

(65) Prior Publication Data

US 2014/0362090 A1    Dec. 11, 2014

Related U.S. Application Data

(60) Provisional application No. 61/832,123, filed on Jun. 6, 2013.

(51) Int. Cl.
  *G06T 11/20*  (2006.01)
  *G06F 3/0481* (2013.01)
  *G09G 5/24*   (2006.01)

(52) U.S. Cl.
  CPC .......... *G06T 11/20* (2013.01); *G06F 3/04812* (2013.01); *G06T 11/203* (2013.01); *G09G 5/24* (2013.01)

(58) Field of Classification Search
  CPC ....... G06T 11/20; G06F 3/04812; G06F 17/24
  See application file for complete search history.

(56) References Cited

U.S. PATENT DOCUMENTS

| | | | |
|---|---|---|---|
| 2010/0134432 A1* | 6/2010 | Seo | G06F 3/04817 345/173 |
| 2012/0044173 A1 | 2/2012 | Homma et al. | |
| 2013/0139097 A1 | 5/2013 | Amano et al. | |
| 2013/0342452 A1* | 12/2013 | Kuo | G06F 3/04883 345/157 |
| 2014/0016867 A1* | 1/2014 | Maurer | G06F 17/211 382/182 |
| 2014/0292701 A1* | 10/2014 | Christiansson | G06F 3/0421 345/173 |

OTHER PUBLICATIONS

International Search Report and Written Opinion, dated Sep. 30, 2014, received in International Patent Application No. PCT/US2014/033091, which corresponds with U.S. Appl. No. 14/069,858, 11 pages.

* cited by examiner

*Primary Examiner* — James A Thompson
*Assistant Examiner* — Tapas Mazumder
(74) *Attorney, Agent, or Firm* — Morgan, Lewis & Bockius LLP

(57) ABSTRACT

Some embodiments provide a method that displays a document that includes several glyphs on a touch screen display. The method receives a touch input on the touch screen display to activate a zoom tool enabling location of a position indicator within a set of associated glyphs. The method automatically divides a touch screen region for the set of associated glyphs into sub-regions. Each sub-region is associated with a position indicator location between two subsequent glyphs. A first sub-region associated with a location between first and second glyphs has a same width as a second sub-region associated with a location between the second glyph and a third glyph. The first and third glyphs do not have an equal width. The method correlates movement of the touch input across the touch screen display with the equally-spaced sub-regions in order to move the position indicator between the glyphs in the associated set.

66 Claims, 10 Drawing Sheets

MOVEMENT OF POSITION INDICATOR ON TOUCHSCREEN

BACKGROUND

Touchscreen devices (e.g., the iPad® and iPhone®, both sold by Apple Inc.) have become more and more prevalent in recent years. For many applications (e.g., e-mail, web browsing, etc.), these devices display text for the user to read and/or edit. Because the devices often have display screens on the smaller side (as compared with desktop or laptop computers), the ability to zoom in on the text is often important to readability.

In addition, especially for editable text (e.g., e-mail), users may want to locate a position indicator, or text cursor, at a specific point between two letters of the text. Certain applications enable such positioning of a location indicator by the movement of a finger (or other object) along the touchscreen through the text. However, especially when moving between narrow letters, precise location of the position indicator may be difficult. FIG. 1 illustrates a prior art example of a word 100 ("willow") and the breakdown of that word horizontally into regions that correspond to the locations between different characters. In the prior art example, a user moving a finger over the word would move a position indicator through the letters "i", "l", and "l" very quickly with minimal movement, whereas moving through a "w" would require significantly more horizontal movement. Thus, if the position indicator (and finger) is initially located to the left of the "w", then movement of the finger to the right by a distance x will move the position indicator in between the "w" and the "i". However, movement of the finger again to the right by a distance x will move the position indicator in between the first "l" and the second "l", past the location between the "i" and the "l". Thus, it can be difficult to position the position indicator in the correct location, especially between narrower letters.

BRIEF SUMMARY

Some embodiments provide a novel method for a touch screen device that divides a touch screen region for a set of associated glyphs (e.g., a word, a portion of a word, a line of text, etc.) into sub-regions that are each associated with locations between pairs of subsequent glyphs. Specifically, some embodiments associate each location between two glyphs in the touchscreen region with an equally-sized sub-region, and associate bounding locations (e.g., locations before the first glyph and after the last glyph) with sub-regions that may be sized differently than the other sub-regions. The touch screen device then correlates movement of touch input across the touch screen sub-regions in order to move a position indicator between the glyphs of the associated set of glyphs.

The method of some embodiments initially identifies conceptual glyph boundaries at equal distances between the start and end of the set of associated glyphs, and associates each of these conceptual glyph boundaries with an actual location between two glyphs. The method then identifies the midpoints between the conceptual glyph boundaries as sub-regions boundaries. Interior sub-regions associated with the locations between two glyphs in the set will then have equal widths (this width being the distance between the conceptual glyph boundaries. However, depending on locations of additional glyphs surrounding the set of associated glyphs, the sub-regions associated with the location before a first glyph in the set and the location after a last glyph in the set may have a different width.

In some embodiments, the method divides the touch screen region upon touch-down of a touch input over the set of associated glyphs. That is, when a user places a finger (or other object) onto the touchscreen over the set of associated glyphs, the method then divides the touchscreen region of the set of glyphs into sub-regions. In some embodiments, the method first correlates the initial location of the touch input with (i) a set of glyphs and (ii) an initial location for the position indicator within the set of glyphs (e.g., between two of the glyphs). This initial location is based on a set of heuristics, in some embodiments, which may identify the closest boundary between two glyphs to the location of the touch input, and assign the position indicator to that boundary. In some embodiments, the initial location is based on the division of the set of associated glyphs into sub-regions. The touch input is located within one of the sub-regions, and the method correlates this sub-region to an initial location for the position indicator.

As stated, some embodiments divide the touchscreen area for a set of associated glyphs into equally-spaced sub-regions. This equal spacing is horizontal in some embodiments (i.e., along the direction in which the glyphs run), such that each location between two glyphs is associated with the same horizontal distance along the touchscreen. Thus, a location between a "w" and an "e" and a location between the "e" and an "l" within the same word will both be associated with an equal horizontal distance of the touchscreen, despite the difference in width between the "w" and the "e". As a result, in some cases, the touch screen device may display a location between a first glyph and a second glyph within a sub-region associated with a location between the second glyph and a third glyph (or, in certain cases, a sub-region associated with a location between a third glyph and a fourth glyph).

As the user moves the touch input across the touchscreen region, the method identifies when the input crosses from one sub-region to the next. Upon the input crossing a sub-region boundary, some embodiments move the position indicator from one position to the next. In some embodiments, the user moves the touch input across a first region of the touchscreen (e.g., the region in which a set of associated glyphs is displayed within a text document), while the position indicator is located within a second display of the set of associated glyphs (e.g., a zoomed-in display of the set of associated glyphs as well as surrounding text). In this way, the object (e.g., finger) used for the touch input does not obstruct the view of the text with the position indicator.

Rather than simply dividing a touch screen region for a word equally upon touch-down of the input, some embodiments dynamically divide the region as the user moves the position indicator through the word. As stated, at time of touch-down of the touch input, the method identifies an initial location of the position indicator. Some embodiments divide the word into two touchscreen regions, one on either side of the initial location of the position indicator, then divide each of these regions into separate sets of equal-width sub-regions. Thus, the sub-regions associated with locations between two glyphs to the left of the position indicator will each have a same first width based on the widths of the glyphs to that side, while the sub-regions associated with locations to the right of the position indicator will each have a same second width. The sub-region associated with the initial location of the position indicator, in this case, will have a width equal to the sum of half the first width and half the second width. As before, the locations at the edges of the set of associated glyphs are associated with sub-regions having a width dependent on the locations and/or widths of glyphs outside of the associated set.

As the touch input moves to one direction (e.g., left), the position indicator will move in that direction based on the initially-divided sub-regions. When the position indicator moves, some embodiments re-divide the region for the portion of the word to the side opposite the direction of movement. That is, as the position indicator moves to the left, the method re-divides the region for the locations between glyphs to the right of the position indicator, which will include a new, additional glyph with each movement of the position indicator. Some such embodiments do not, however, re-divide the region for the portion of the word to the side in the direction of movement (i.e., the left side in this example), as doing so would have the potential to create confusion for a user.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description further describe the embodiments described in the Summary as well as other embodiments. Accordingly, to understand all the embodiments described by this document, a full review of the Summary, the Detailed Description, and the Drawings is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for a touch screen device that divides a touch screen region for a set of associated glyphs (e.g., a word, a portion of a word, a line of text, etc.) into sub-regions that are each associated with locations between pairs of subsequent glyphs. Specifically, some embodiments associate each location between two glyphs in the touchscreen region with an equally-sized sub-region, and associate bounding locations (e.g., locations before the first glyph and after the last glyph) with sub-regions that may be sized differently than the other sub-regions. The touch screen device then correlates movement of touch input across the touch screen sub-regions in order to move a position indicator between the glyphs of the associated set of glyphs.

Figure 2:
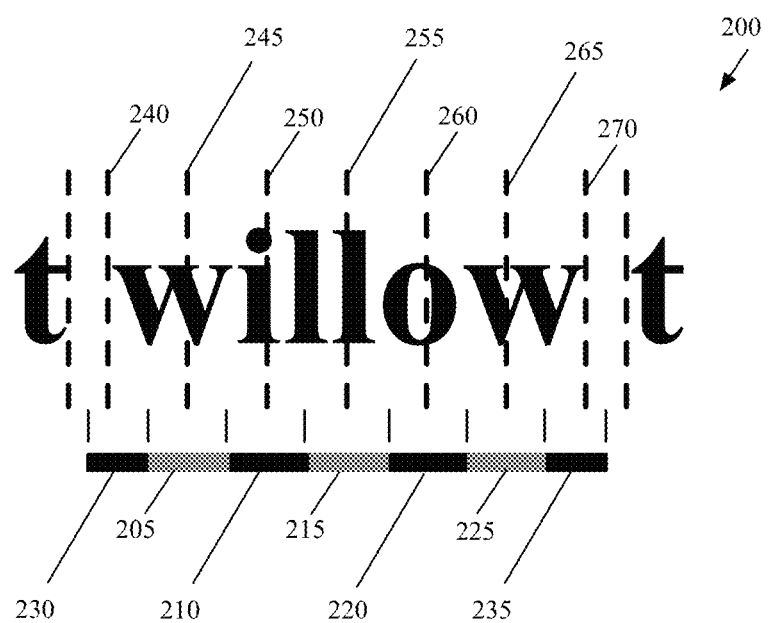
FIG. 2 conceptually illustrates a word divided into six equal-width sub-regions.

FIG. 2 conceptually illustrates a word 200 ("willow") divided as such into five equal-width sub-regions 205-225, and two sub-regions 230 and 235 with different widths. The word 200 contains six letters, and the touchscreen region within which the word is displayed is therefore initially divided into six equal width areas by conceptual glyph boundaries 240-270. Each of these conceptual glyph boundaries is associated with a location either between two glyphs (for boundaries 245-265), before the first glyph (boundary 240), or after the last glyph (boundary 270). Each of the conceptual glyph boundaries is then associated with the one of the sub-regions 205-235 that surrounds it, thereby relating the sub-regions to the possible position indicator locations at the actual glyph boundaries. The sub-region associated with a particular conceptual glyph boundary occupies the portion of the touchscreen within the word that is closer to the particular conceptual glyph boundary than to any other conceptual glyph boundary.

Thus, the width of the sub-region 205 that corresponds to the location between the "w" and the "i" equals the width of the sub-region 210 that corresponds to the location between the "i" and the "l", despite the "w" having a significantly different width in the display than the "l". As a result, the location between the "w" and the "i" is actually located within the sub-region 205, which corresponds to the location between the "i" and the "l". This sub-region 205 also covers the location between the "i" and the "l".

In some embodiments, the method divides the touch screen region upon touch-down of a touch input over the set of associated glyphs, as opposed to dividing a touch screen region for each word into sub-regions at the time a document loads on the page. That is, when a user places a finger (or other object) onto the touchscreen over the set of associated glyphs, the method then divides the touchscreen region of the set of glyphs into sub-regions. In some embodiments, the method first correlates the initial location of the touch input with (i) a set of glyphs and (ii) an initial location for the position indicator within the set of glyphs (e.g., between two of the glyphs). This initial location is based on a set of heuristics, in some embodiments, which may identify the closest boundary between two glyphs to the location of the touch input, and assign the position indicator to that boundary. In some embodiments, the initial location is based on the division of the set of associated glyphs into sub-regions. The touch input is located within one of the sub-regions, and the method correlates this sub-region to an initial location for the position indicator.

Figure 3:
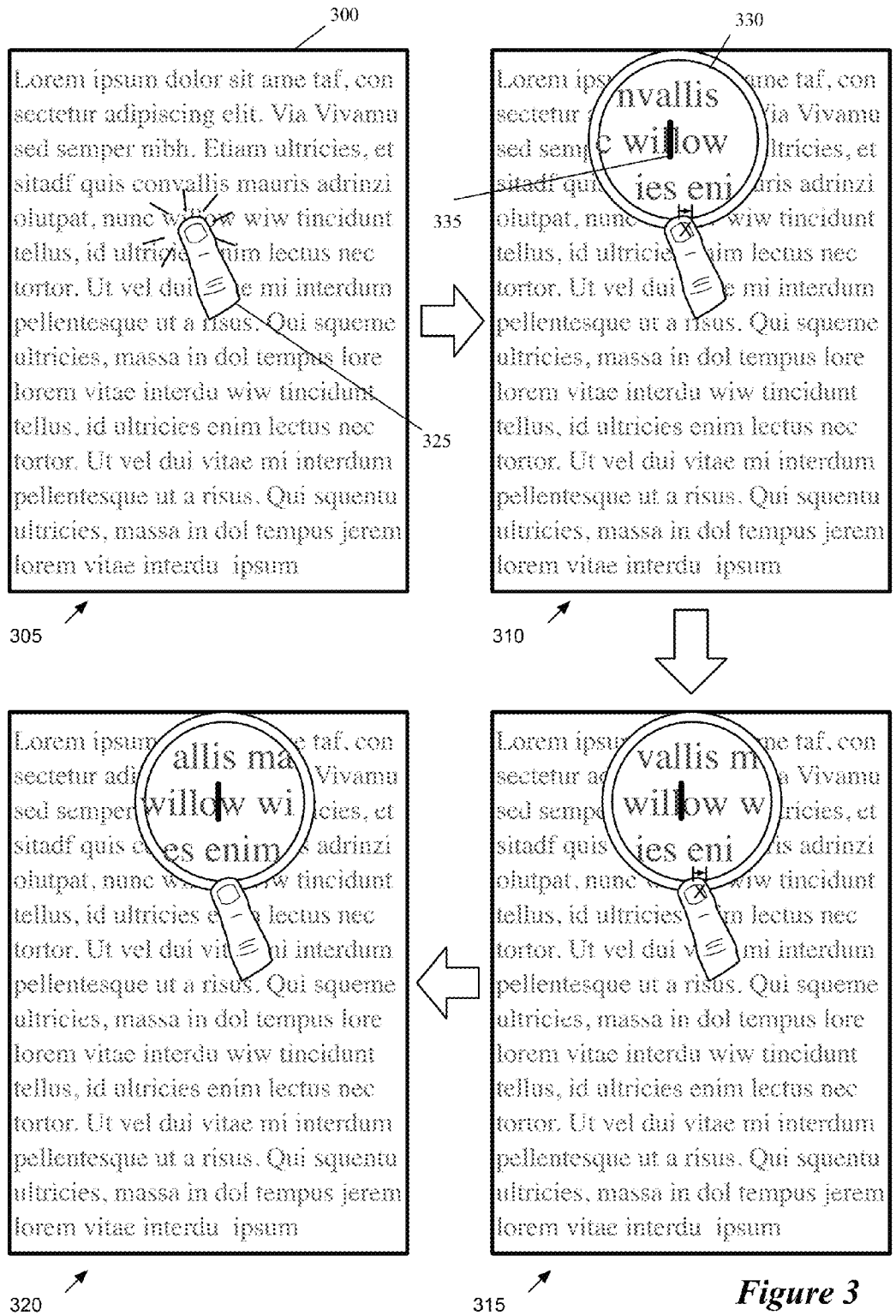
FIG. 3 illustrates a touchscreen displaying a document containing text over the course of four stages in which a user activates a zoom tool and moves a position indicator within a word of the text.

FIG. 3 illustrates a touchscreen 300 displaying a document containing text over the course of four stages 305-320 in which a user activates a zoom tool and moves a position indicator within a word of the text. In different embodiments, the touchscreen 300 functions as both a display screen and an input device for a smart phone, tablet computer, or other electronic device. However, for simplicity, the additional portions of the touchscreen device (e.g., other hardware controls, etc.) are not shown in this figure. Furthermore, while this figure illustrates only the display of a text document, one of ordinary skill in the art will recognize that in many cases the touchscreen device displays a text document inside a window or frame, with additional information (e.g., a clock, a connection strength indicator, document name, etc.) displayed along the edges of the screen.

As shown in stage 305, the user places a finger 325 down onto the touchscreen 300. While this and other examples illustrate the use of a finger for touchscreen input, one of ordinary skill in the art will recognize that other objects could be used for touchscreen input, such as a thumb, multiple fingers at once, a stylus, etc. In some embodiments, in order to activate a zoom tool with a position indicator, the user holds the finger 325 down on the touchscreen in the particular location for at least a threshold time (e.g., 0.5 seconds, 1 second, etc.).

Figure 1:
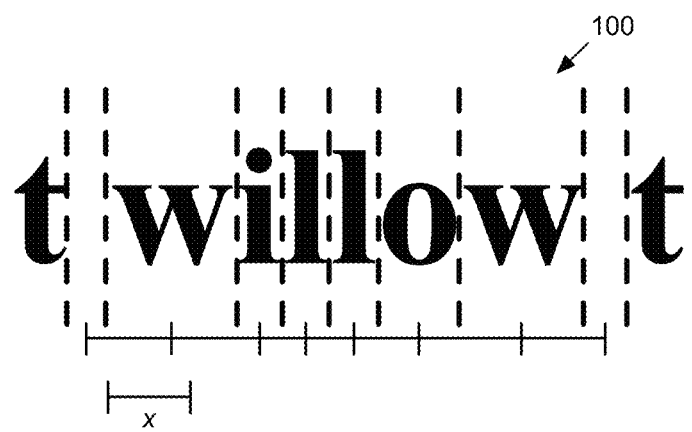
FIG. 1 illustrates a prior art example of a word and the breakdown of that word horizontally into regions that correspond to the different characters.

The second stage 310 illustrates the result of the user interaction from the first stage 305. As shown, holding the finger 325 down on the touchscreen for the threshold time activates a zoom tool 330. In this case, the zoom tool 330 is a zoom loupe, that magnifies the portion of the text document over which the finger 325 is placed. Within the zoom loupe 330, the touchscreen device displays a position indicator 335 (i.e., a text cursor). The position indicator of some embodiments identifies an edit point within the text. The user can then add text at this location, delete text from this location, etc. In some embodiments, the touchscreen device automatically identifies the initial location of the touch input and correlates this to a location for the position indicator (i.e., a word and a location between two glyphs within the word). In this case, the touch input is centered between the first "l" and second "l" in "willow". Some embodiments identify, for the initial location of the position indicator, the closest boundary between two glyphs to the initial touch-down point. Other embodiments divide the word within which the touchdown point is located into sub-regions, as described above by reference to FIG. 1, and place the position indicator at the glyph boundary that corresponds to the sub-region within which the touchdown point is located. In this case, both of these techniques result in the initial placement of the position indicator between the first "l" and second "l".

In addition to magnifying the portion of the text document, the zoom loupe displays the magnified portion above the location of the touch input. That is, while the touch input is located over the set of associated glyphs of the document, the device displays a zoomed-in display of the set of glyphs and position indicator at a different location, so that the object used for the touch input (e.g., stylus, finger, etc.) does not obstruct the view of the text with the position indicator. In some embodiments, as shown, the zoom loupe displays not only a magnified view of the set of associated glyphs (the word "willow"), but also additional text (or, in some cases, non-text portions of the document) that surrounds the set of associated glyphs within which the position indicator is located.

In addition to showing the appearance of the zoom loupe 330, the second stage 310 illustrates that the user moves her finger 325 a distance x to the right. This distance x is the distance along the touchscreen covered by one of the sub-regions associated with one of the locations between two of the glyphs in the word "willow". Thus, this distance, is less than the width of the "w", but greater than the width of either the "l" or the "i". As a result, the third stage 315 illustrates that the position indicator has moved to the right, in between the second "l" and the "o". In some embodiments, as the user moves the touch input across the touchscreen region for a set of associated glyphs, the device identifies when the input crosses from one sub-region to the next. Upon the input crossing a sub-region boundary, some embodiments move the position indicator from one position to the next. Therefore, when the user moves her finger 325 by the distance x, the finger crosses the sub-region boundary between the sub-region associated with the position between the first "l" and the second "l" and the sub-region associated with the position between the second "l" and the "o", and therefore causes the position indicator to move to the location between these letters.

The third stage additionally illustrates that the user again moves her finger 325 the same distance x to the right. As a result, the fourth stage 320 illustrates that the position indicator has again moved to the right, to a new location in between the second "o" and the "w". The distance of the position indicator movement between stages 315 and 320 is significantly greater than the distance of the position indicator movement between stages 320 and 325, despite the same distance moved by the finger 325 across the touchscreen.

Rather than simply dividing a touch screen region for a word (or other associated set of glyphs) equally upon touch-down of the input, some embodiments dynamically divide the region as the user moves the position indicator through the word. As stated, at time of touch-down of the touch input, the device identifies an initial location of the position indicator. Some embodiments divide the word into two touchscreen regions, one on either side of the initial location of the position indicator, then divide each of these regions into separate sets of equal-width sub-regions. Thus, the sub-regions associated with locations between two glyphs to the left of the position indicator will each have a same first width based on the widths of the glyphs to that left side, while the sub-regions associated with locations to the right of the position indicator will each have a same second width. The sub-region associated with the initial location of the position indicator, in this case, will have a width equal to the sum of half the first width and half the second width. As before, locations at the edges of the set of associated glyphs are associated with sub-regions having a width dependent on the locations and/or widths of glyphs outside of the associated set.

As the touch input moves to one direction (e.g., left), the position indicator will move in that direction based on the initially-divided sub-regions. When the position indicator moves, some embodiments re-divide the region for the portion of the word to the side opposite the direction of movement. That is, as the position indicator moves to the left, the method re-divides the region for the locations between glyphs to the right of the position indicator, which will include a new, additional glyph with each movement of the position indicator. Some such embodiments do not, however, re-divide the region for the portion of the word to the side in the direction of movement (i.e., the left side in this example), as doing so would have the potential to create confusion for a user.

Figure 4:
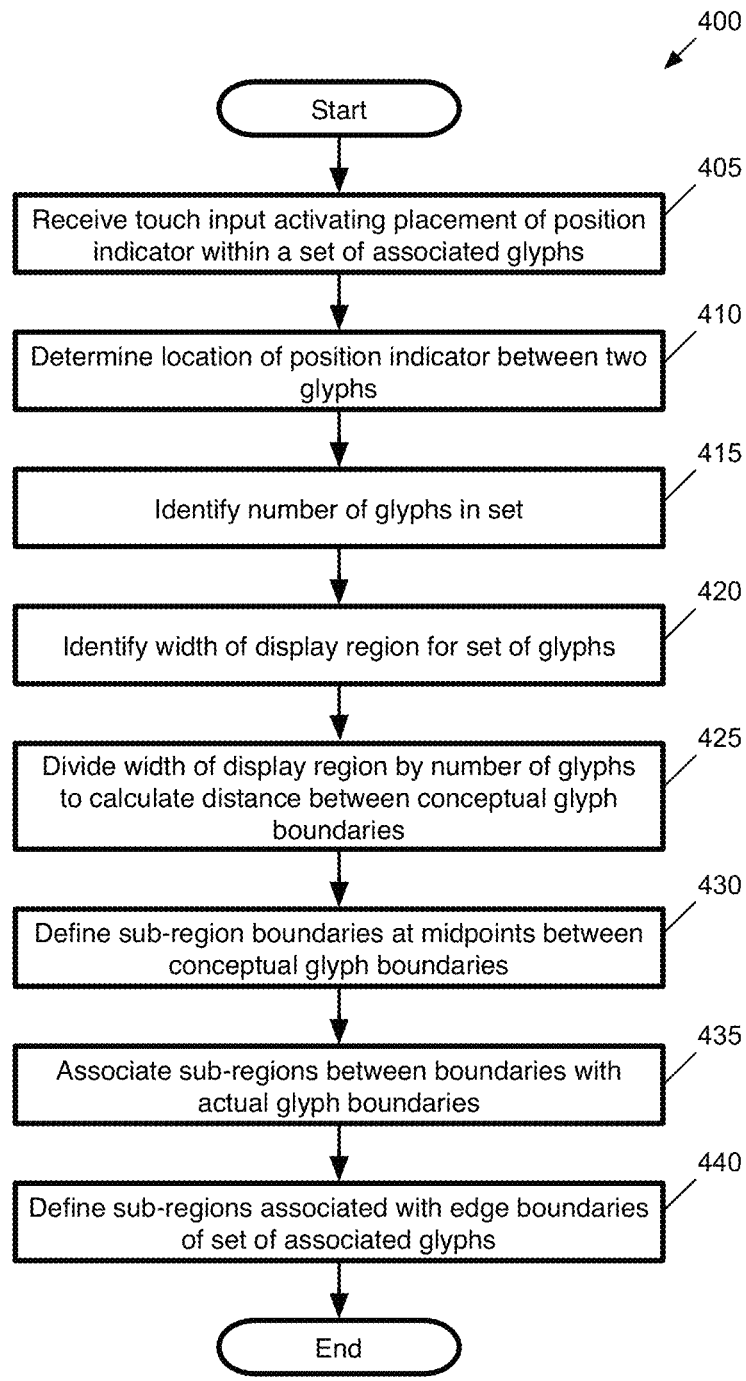
FIG. 4 conceptually illustrates a process of some embodiments for dividing a region of a touchscreen upon touch-down of a touch input.
Figure 5:
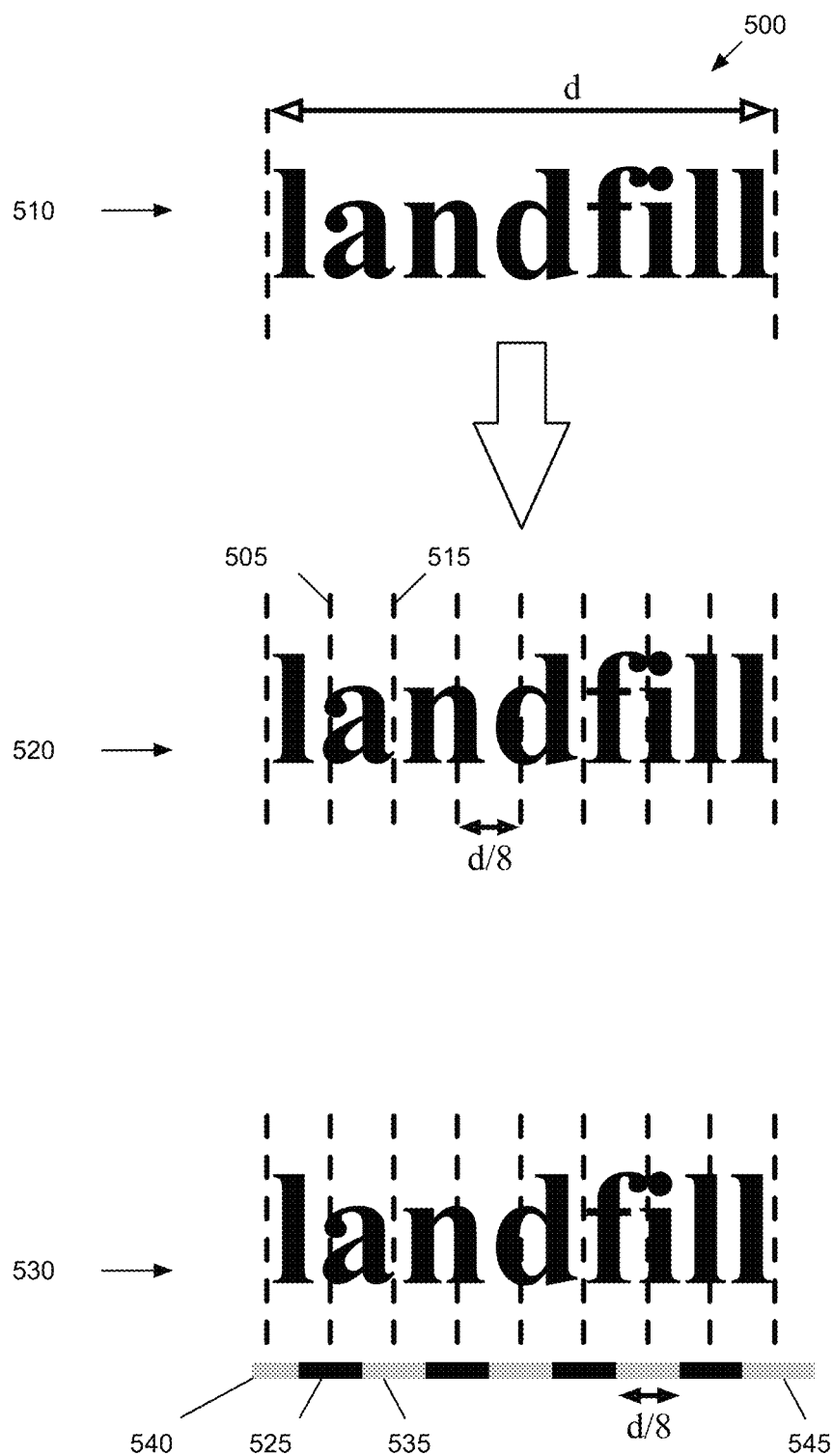
FIG. 5 conceptually illustrates the division of a touchscreen region displaying a word into sub-regions of equal width.
Figure 6:
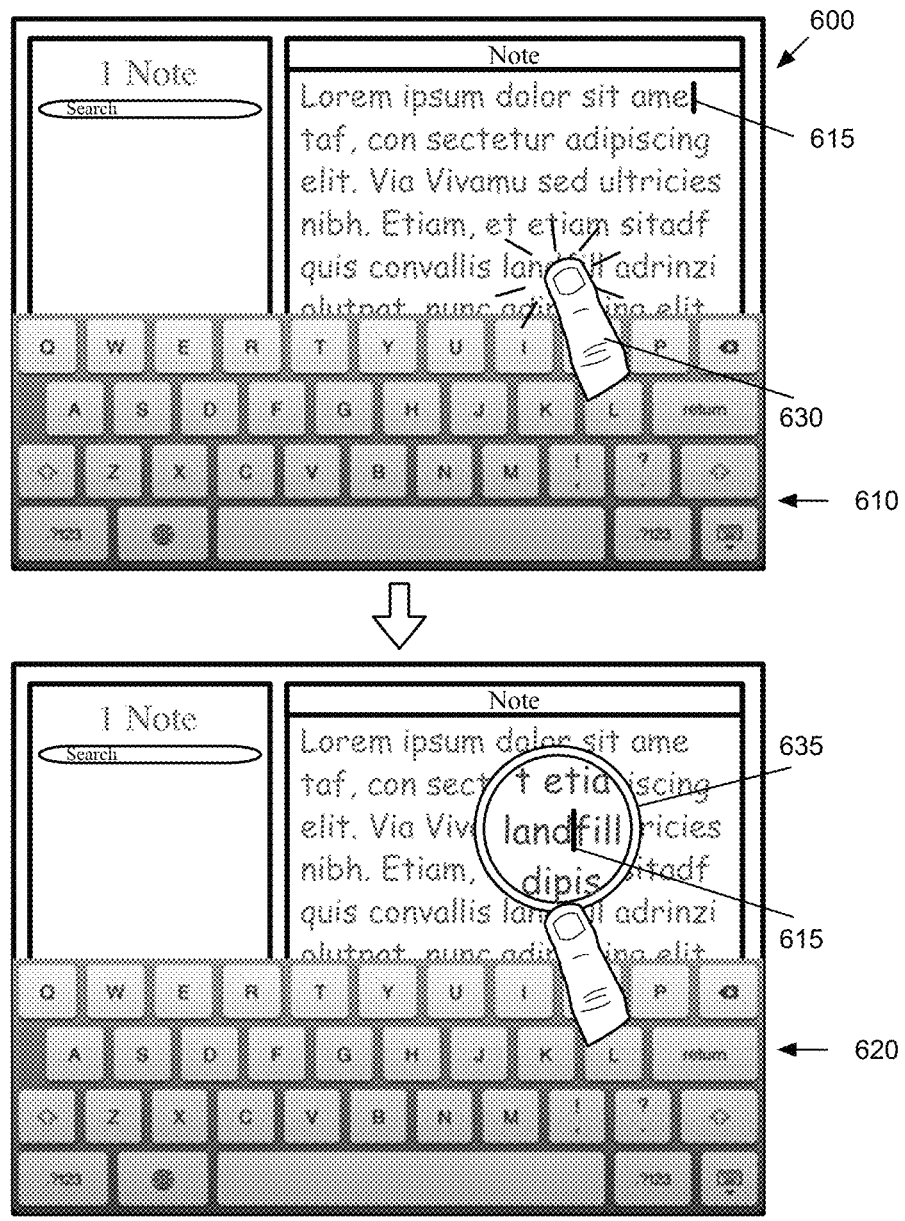
FIG. 6 illustrates two stages of a touchscreen display.
Figure 7:
FIG. 7 conceptually illustrates the division into sub-regions of a region of the touchscreen display in which a particular word is displayed.
Figure 8:
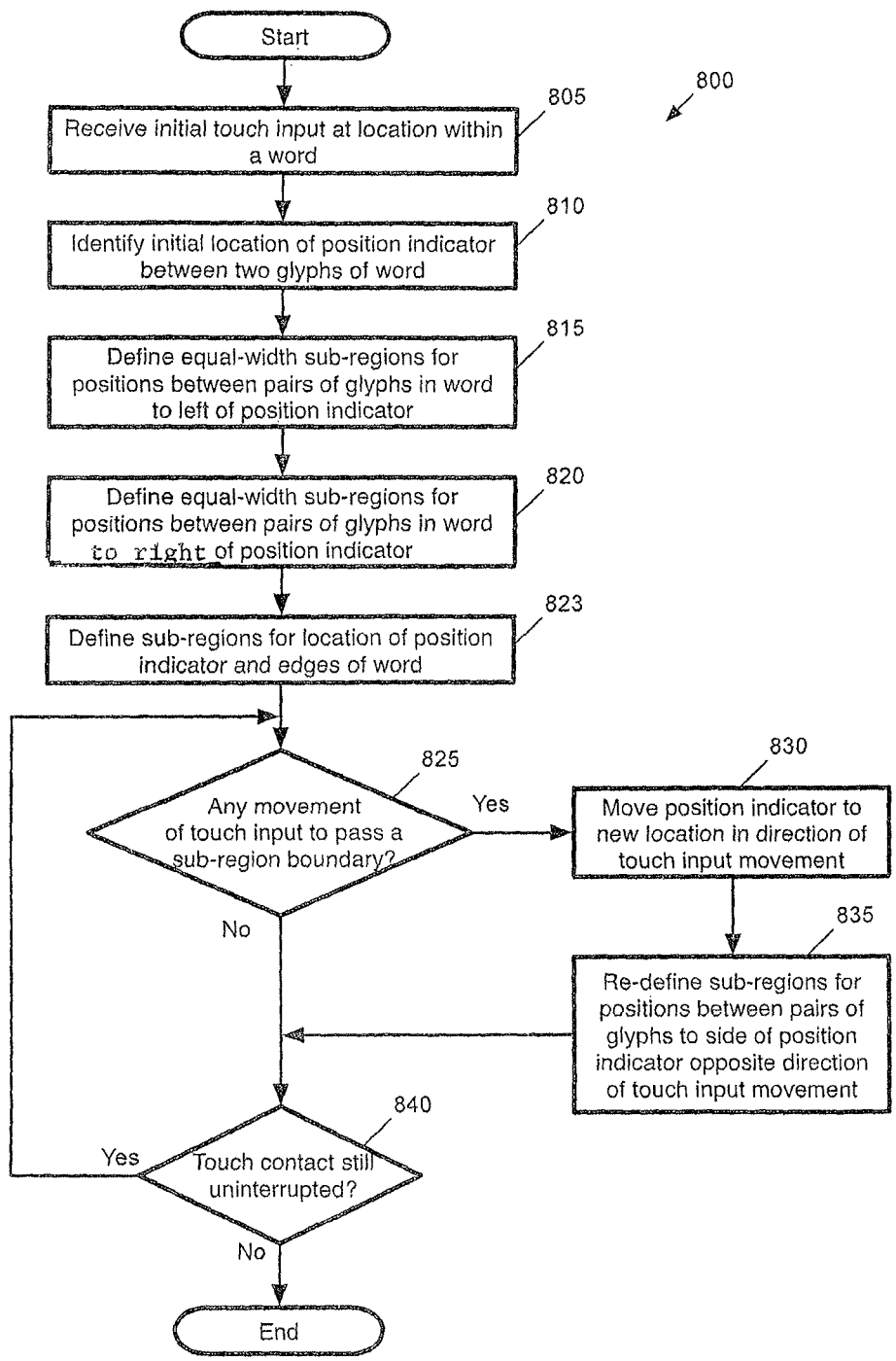
FIG. 8 conceptually illustrates a process of some embodiments that performs dynamic modifications to the touchscreen display sub-regions as a position indicator moves through a set of glyphs in response to touch input.
Figure 9:
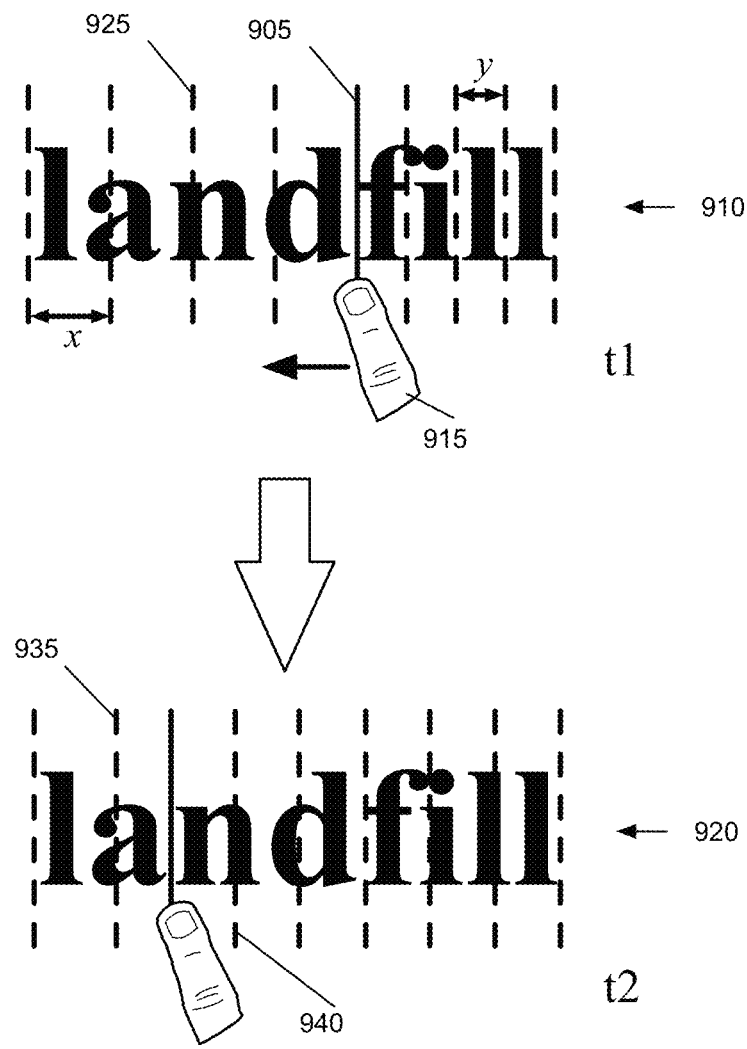
FIG. 9 conceptually illustrates the re-division of a touchscreen display region for a word as a user moves the location indicator through the word via touch input.

The following describes in greater detail various aspects of the novel division of a touchscreen region for an associated set of glyphs. FIGS. 4 and 5 describe the initial division of the touchscreen region for a word into sub-regions. FIGS. 6 and 7 then illustrate the modification of this division in some embodiments, by identifying two sub-regions on either side of an initial location of the position indicator. Finally, FIGS. 9 and 8 illustrate a dynamic aspect of the touchscreen region division, in which the regions are modified as touch input (and therefore the position indicator) moves in one direction or the other within a word.

FIG. 4 conceptually illustrates a process 400 of some embodiments for dividing a region of a touchscreen upon touch-down of a touch input. In various different embodiments, the process 400 may be performed by an operating system of a touchscreen device or by an application running on top of that operating system. In some embodiments, although an application running on the device displays a document, the zoom tool and its associated position indicator are provided by the operating system, and therefore the operating system performs the calculations for dividing the touchscreen into regions and sub-regions and moving the position indicator through a word within the zoom tool. In other embodiments, these functions are performed by the application that displays the document, by using functions provided by the operating system.

The process 400 will be described in part by reference to FIG. 3, previously described above, as well as by reference to FIG. 5. FIG. 5 conceptually illustrates the division of a touchscreen region displaying a word ("landfill") into sub-regions. As shown, the process 400 begins by receiving (at 405) touch input activating placement of a location indicator within a set of associated glyphs. In some embodiments, the touch input is a press and hold input for a particular time duration over editable text. For instance, when a user presses her finger (or a stylus, etc.) over editable text on a touchscreen for at least a threshold duration (e.g., 0.5 seconds, 1 second, etc.). Performing this action, in some embodiments, causes the activation of a zoom loupe feature such as that illustrated in FIG. 3. As shown in FIG. 3, the zoom loupe of some embodiments presents a zoomed-in view of a portion of a document, and also locates a position indicator (a text cursor) within the text of the portion of the document.

Next, the process 400 determines (at 410) a location of the position indicator between two glyphs in the text. In some embodiments, the touch input is resolved by the touchscreen device to a specific location, such as an x-y coordinate pair (e.g., by the operating system of the device, using data generated by the touchscreen). That is, while the input will be spread out on the touchscreen (due to the resolution of the touchscreen being much finer-grained than the size of the user's finger or other object), this input data is resolved to a specific location. Some embodiments then correlate this specific location to a particular location between two glyphs. For example, some embodiments first identify a text line based on the vertical coordinate, then subsequently identify the closest boundary between two glyphs within the identified text line based on the horizontal coordinate. Other embodiments may use different techniques to identify a location between two glyphs for the position indicator. In addition, as shown in FIG. 3, the position indicator may not necessarily be displayed within the document (i.e., directly under the touch input). Instead, the device displays the zoom loupe with the magnified document content in a different location on the touchscreen (e.g., above the underlying content, for optimal viewing by the user, as shown in FIG. 3).

The process 400 then goes about dividing the touchscreen region for the associated set of glyphs into sub-regions. The process identifies (at 415) the number of glyphs in the set. For instance, if the set of associated glyphs is a word, the process identifies the number of glyphs in the word. As described below, in some embodiments, the set of associated glyphs is a portion of the word to one side of the position indicator (i.e., each word is split into two separate sets of glyphs for the purposes of this division). Furthermore, some embodiments treat an entire text line as a set of associated glyphs, dividing up the touchscreen region for the text line into sub-regions, all but the first and last of which are equally-spaced. FIG. 5, as indicated, illustrates the division of the word "landfill" 500. This figure illustrates three conceptual stages 510-530. In this case, the set of associated glyphs (the word) has eight glyphs, and thus seven possible position indicator locations between two of the glyphs.

Next, the process 400 identifies (at 420) a width of the display region for the set of glyphs. Some embodiments measure the width from the leftmost point of the leftmost glyph in the set to the rightmost point of the rightmost glyph in the set. Because the process 400 is concerned with dividing the display region of the touchscreen, the size of the displayed text (e.g., due to the font size, the zoom level of the current page, etc.) will affect the calculation. In the example of FIG. 5, stage 510 illustrates that the display region for the word "landfill" 500 has a width d.

The process then divides (at 425) the identified width of the display region by the number of glyphs in the set to calculate the distance between conceptual glyph boundaries, which will also be the width of the sub-regions associated with the actual glyph boundaries between two of the glyphs. The second stage 520 of FIG. 5 conceptually illustrates these conceptual glyph boundaries for the word "landfill" 500. As shown, this region (having width d) is divided horizontally by seven equally-spaced boundaries, a distance d/8 apart. In addition, each of these conceptual boundaries is associated with a position between two glyphs, in order. The first conceptual boundary 505 is associated with the position between the first "l" and the "a", the second conceptual boundary 515 is associated with the position between the "a" and the "n", etc.

Next, the process 400 defines (at 430) sub-region boundaries at midpoints between the conceptual glyph boundaries. The process also associates (at 435) sub-regions formed between these boundaries with the actual glyph boundaries. Lastly, the process defines (at 440) sub-regions associated with edge boundaries of the set of associated glyphs, then ends. The actual glyph boundaries, in some embodiments, are the possible position indicator locations between glyphs within the set of associated glyphs (e.g., the position between the first "l" and the "a"), while the edge boundaries are the boundaries located to the left of the first glyph and the right of the last glyph (e.g., the position to the left of the first "l" and the right of the last "l").

The third stage 530 of FIG. 5 conceptually illustrates these sub-regions for the word "landfill" 500. For instance, the sub-region 525 is associated with the conceptual glyph boundary 505, and thus associated with the position between the "l" and the "a". The sub-region 535, having the same width, is associated with the conceptual glyph boundary 515, and thus associated with the position between the "a" and the "n". As shown, like the distance between the conceptual glyph boundaries in the second stage 520, the sub-regions each have a width of d/8. This stage also illustrates the sub-regions associated with the edge boundaries. A sub-region 540 is associated with the left edge boundary of the word, and a sub-region 545 is associated with the right edge boundary. The sub-region 540 and the sub-region 545 have different widths than the other sub-regions. In this case, the sub-region 540 has a width smaller than d/8, while the sub-region 545 has a width larger than d/8. These sub-regions are dependent on the locations on the touchscreen of the next glyph boundaries (e.g., the last glyph of the word to the left of "landfill" and the first glyph of the word to the right of "landfill".

While each of these sub-regions is shown as simply having a width in this figure, one of ordinary skill in the art will recognize that the sub-regions are in fact sub-regions of a touchscreen display, and therefore have upper and lower bounds as well. In many cases, the regions above and below a given word are associated with different words in different lines of text. When the user input moves up or down into one of these regions, the process 400 is performed for the word located in the new region.

As in the process 400, some embodiments do not divide the touchscreen region for a set of associated glyphs (e.g., a word, line of glyphs, etc.) until receiving touch input over the set of associated glyphs. On the other hand, some embodiments perform the division calculation upon loading a document for display. For instance, when a user opens a document, some embodiments perform division calculations for each of the words on the page. As the user scrolls through the document, the words move, and the calculated sub-regions of the display screen for a particular word move along with the word. However, performing the division calculations upon page load introduces significant computation costs. In many cases, users will never activate the zoom tool and position indicator, and therefore no calculation will be needed at all. As such, some embodiments perform the calculations upon touch-down (or as user input moves from a location over a first set of glyphs to a new location over a second set of glyphs).

FIG. 5 illustrates a case in which the set of associated glyphs is an entire word in which the position indicator is located, and each of the glyphs is assigned an equal-size sub-region. FIGS. 6 and 7, on the other hand, illustrate that some embodiments use the initial location of the position indicator to split a word into two sets of associated glyphs, and divide each of these sets separately into equal-width sub-regions. Specifically, FIG. 6 illustrates two stages 610 and 620 of a touchscreen display 600, while FIG. 7 conceptually illustrates the division into sub-regions of a region of the touchscreen display in which a particular word is displayed.

The touchscreen display 600, as with the touchscreen 300, may function as both a display screen and input device for a smart phone, tablet computer, or other electronic device. Again, for purposes of simplicity, the additional portions of the touchscreen device (e.g., surrounding hardware, additional hardware controls, etc.) are not shown in the figure. Currently, the touchscreen display 600 displays a Notes application. The GUI of this application includes a section in which an editable document is displayed. Within the editable document, the application displays a position indicator 615, currently located at the end of a first line of text. This position indicator (i.e., a text cursor) indicates to the user a location at which newly entered text will be added to the document. Thus, if the user were to use the touchscreen keyboard 625 to enter text, the text would appear at the end of the first line (after the word "ame").

If the user wishes to change the location at which entered text will appear, some embodiments enable the user to tap a location within the document display, and automatically move the cursor to the tapped location. However, tapping a specific position between two characters may be difficult due to the disparity between the resolution required to differentiate between two subsequent positions and the size of the object with which the user taps the touchscreen (e.g., the user's finger).

Accordingly, in order to more accurately locate the position indicator, some embodiments enable the user to activate a zoom loupe that zooms in on a portion of the document, and then move the position indicator within the document text inside the zoom loupe. As shown at the first stage 610, the user places an object (her finger 630, in this case) on the touchscreen 600 over a word in the document for at least a threshold time (i.e., to differentiate the user input from a 'tap'). As illustrated in the second stage 620, after this threshold time, the zoom loupe 635 appears. The zoom loupe 635 displays, in a magnified fashion, a section of the text document above the location of the section within the document. That is, while the user's finger 630 is located on top of the word "landfill" in the document, the zoom loupe 635 displays the magnified word "landfill" higher on the touchscreen 600, such that the word is fully visible.

In addition, as shown, the position indicator 615 is now located within the zoom loupe, between the "d" and the "f" of "landfill". As described above by reference to the process 400, at touch-down of the user input, the device (or, specifically, an application operating on the device) identifies a location for the position indicator 615. By moving the user input (i.e., the finger 630) to the left and the right, the user can locate the position indicator 615 at a precise location with the word. In addition, the user may move the input up or down to move the position indicator 615 onto a different line of text.

FIG. 7 conceptually illustrates the conceptual glyph boundaries for use in dividing a touchscreen region 700 for the word "landfill" into nine sub-regions for the nine possible position indicator locations within the word according to some embodiments. As shown, the touchscreen region 700 includes both vertical and horizontal bounds. The vertical bounds are determined by the boundaries between text lines. The horizontal bounds, in some embodiments, run from halfway between the left edge of the word and the right edge of the previous word to halfway between the right edge of the word and the left edge of the next word. As in stage 620, in FIG. 7 the position indicator 615 is located between the "d" and the "f" in the word "landfill".

Rather than divide the entire word with equally-spaced conceptual glyph boundaries, some embodiments treat the sets of glyphs to either side of the position indicator (within the word in which the position indicator is located) as separate sets of associated glyphs. Thus, "land" is a first set of associated glyphs, while "fill" is a second set of associated glyphs. Accordingly, the spacing between the conceptual glyph boundaries to one side of the position indicator 615 has a different width than the spacing between the conceptual glyph boundaries to the other side of the position indicator 615 (and therefore the sub-regions associated with the positions between glyphs to one side of the position indicator will have a different width than the sub-regions associated with the positions between glyphs to the other side of the position indicator).

The spacing between the conceptual glyph boundaries 705, for the letters "land", has a first width that is the width $d_1$ divided by four, while the spacing between the conceptual glyph boundaries 710, for the letters "fill", has a second width that is the width $d_2$ divided by four. The width $d_1/4$ will then be the width of the sub-regions associated with the positions between the first "l" and the "a", between the "a" and the "n", and between the "n" and the "d". Similarly, the width $d_2/4$ will then be the width of the sub-regions associated with the positions between the "f" and the "i", between the "i" and the second to last "l", and between the second to last "l" and the last "l". The width of the sub-region for the position between the "d" and the "f" encompasses the set of points that is closer to the conceptual glyph boundary between these two glyphs (which is located at the same position as the actual glyph boundary, and is part of both sets 705 and 710) than to any of the other conceptual glyph boundaries. This sub-region will have a width of $d_1/4+d_2/4$. The sub-region for the position before the first "l" has a width that runs from the left edge of the touchscreen display region 700 to the position halfway between the left edge of the "l" and the conceptual glyph boundary to its right. Similarly, the sub-region for the position after the last "l" has a width that runs from the right edge of the touchscreen display region 700 to the position halfway between the right edge of the "l" and the conceptual glyph boundary to its left.

Because the overall width of the four letters that start the word "landfill" is greater than the four letters that end the word, the display screen sub-regions associated with the positions between glyphs to the left of the position indicator are significantly wider than the display screen sub-regions associated with the positions between glyphs to the right of the position indicator. Thus, when the user moves the touch input to the left, this input (e.g., the user's finger) will need to move a greater distance to the left than to the right in order to cause the position indicator 615 to move to a new location.

Specifically, in some embodiments, the position indicator (e.g., indicator 615) moves to a new location upon crossing a sub-region boundary. Thus, in the example shown in FIGS. 3 and 2, when the user's finger 325 crosses the boundary between region 215 and 220, the position indicator moves one letter to the right. In some embodiments in which the touchscreen display for a word is divided as shown in FIG. 7 (i.e., with the glyphs to either side of the position indicator treated as separate sets of associated glyphs), the device dynamically updates the sub-regions for the glyphs in the word.

FIG. 8 conceptually illustrates a process 800 of some embodiments that performs such dynamic modifications to the touchscreen display sub-regions as a position indicator moves through a set of glyphs (e.g., a word) in response to touch input. In various different embodiments, the process 800 may be performed by an operating system of a touchscreen device or by an application running on top of that operating system. In some embodiments, although an application running on the device displays a document, the zoom tool and its associated position indicator are provided by the operating system, and therefore the operating system performs the calculations for dividing the touchscreen into regions and sub-regions and moving the position indicator through a word within the zoom tool. In other embodiments, these functions are performed by the application that displays the document, by using functions provided by the operating system.

The process 800 will be described in part by reference to FIG. 9, which conceptually illustrates the re-division of a touchscreen display region for a word as a user moves the location indicator through the word via touch input. For the sake of clarity, this figure illustrates a user's finger location within a word in which the position indicator is located. However, one of ordinary skill in the art will recognize that in some embodiments, as illustrated in FIG. 6, the user locates touch input over a display of a word in a document, while the device displays the position indicator within a different, magnified display of the word.

As shown, the process 800 begins by receiving (at 805) an initial touch input at a location within a word. While the process 800 is described for a word, different embodiments perform a similar process in which the set of associated glyphs is a text line, or a group of words (e.g., a word in which the position indicator is located as well as the words on either side). In some embodiments, the touch input is a press and hold input for a particular time duration over editable text, as described above by reference to process 400. In some embodiments, the device only activates the zoom tool when the particular input is received over an editable document, such as a note, an e-mail, a form within a web page, etc. Other embodiments additionally allow the user to locate a position indicator within non-editable text, such as a web page, PDF document, etc.

Next, the process 800 identifies (at 810) an initial location for the position indicator between two glyphs of the word (or at an edge of the word). In some embodiments, the touch input is resolved by the touchscreen device to a specific location, such as an x-y coordinate pair (e.g., by the operating system of the device, using data generated by the touchscreen). That is, while the input will be spread out on the touchscreen (due to the resolution of the touchscreen being much finer-grained than the size of the user's finger or other object), this input data is resolved to a specific location. Some embodiments then correlate this specific location to a particular location between two glyphs. For example, some embodiments first identify a text line based on the vertical coordinate, then subsequently identify the closest boundary between two glyphs within the identified text line based on the horizontal coordinate. Other embodiments may use different techniques to identify a location between two glyphs for the position indicator.

With the position indicator located within a word, the process 800 defines (at 815) equal-width sub-regions for positions between the pairs of glyphs in the word located to the left of the position indicator. The process also defines (at 820) equal-width sub-regions for positions between pairs of glyphs in the word located to the right of the position indicator. While it is possible for the first and second widths to be equal, these widths may also be different, as is the case in FIG. 7. The process additionally defines (at 823) sub-regions for the location of the position indicator and the edges of the word, which may have different widths than the two sets of equal-width sub-regions.

The first stage 910 of FIG. 9 illustrates the conceptual glyph boundaries used to define display screen sub-regions for the word "landfill", similar to that shown in FIG. 7 but in a different font. The device displays the position indicator 905 between the "d" and the "f". As such, the spacing between the conceptual glyph boundaries in the "land"

region of the display screen has a width x, while the spacing between the conceptual glyph boundaries in the "fill" region of the display screen has a width y, where x>y in this case due to the widths of the "a", "n", and "d" glyphs being wider than those to the right of the position indicator. The location of the position indicator is shown with a solid line, while the conceptual glyph boundaries are displayed as dashed lines.

With the display screen initially divided and the position indicator located, the process determines (at 825) whether any movement of the touch input to pass a sub-region boundary has been received. In addition to processing tap, press-and-hold, etc. touch gestures, the touchscreen device of some embodiments tracks movement of touch inputs. As the touch input (e.g., the user's finger) moves to one side or the other, the touchscreen device tracks the coordinates at which the touch input is located and sends the input location information to the process managing the zoom tool (e.g., process 800). The process managing the zoom tool then determines whether the touch input location has crossed from a first sub-region into a different sub-region of the touchscreen display.

When the movement has crossed a boundary between two sub-regions, the process moves (at 830) the position indicator to a new location in the direction of the touch input movement. In some embodiments, when the touch input crosses a boundary, the process locates the position indicator at the location between two glyphs associated with the sub-region in which the input is now located.

In the example shown in FIG. 9, in the first stage 910 (at time t1), the user's finger 915 (representing the touch input) is located between the "d" and the "f", and is shown moving to the left. The second stage 920 illustrates a later time t2 after the user's finger 915 has moved to the left, to a location within the "n". While not quite located all the way to the left of the "n", the finger 915 (as translated to touch input by the touchscreen device) has moved to a location closer to the boundary 925 shown in the first stage, which is associated with the position indicator location between the "a" and the "n".

In addition to moving the position indicator, the process 800 re-defines (at 835) the sub-regions for positions between pairs of glyphs to the side of the position indicator opposite the direction of movement of the touch input. That is, as the touch input (and therefore the position indicator) moves to the left (or the right), the set of glyphs to the right (or left) increases in number. Rather than the display screen sub-regions for locations between these pairs of glyphs remaining static based on the initial location of the position indicator, the touchscreen device recalculates the sub-regions for the locations between pairs of glyphs to the right (or left) of the position indicator. In order to maintain the constant distance between sub-region boundaries (and therefore, correlated movements of the position indicator) in the direction of the touch input movement, only the sub-regions for locations between pairs of glyphs to the opposite of the direction of movement are recalculated.

In the example of FIG. 9, the second stage 920 illustrates this recalculation of conceptual glyph boundaries for the locations between pairs of glyphs to the right of the position indicator 905. As the position indicator 905 has moved to the left, the spacing between the conceptual glyph boundaries associated with the locations between pairs of glyphs in the "ndfill" portion of the word (and therefore the width of the sub-regions associated with these locations) are calculated to have an equal width z, where x>z>y. The conceptual glyph boundary 935 associated with the location between the "l" and the "a" has not moved, and in some embodiments, the sub-region for that conceptual glyph boundary remains unchanged. Thus, if the user continues moving her finger 915 to the left, the position indicator will continue to jump between glyphs at equal touchscreen distances. On the other hand, if the user starts moving her finger 915 back to the right, the position indicator will next move when half the sub-region boundary halfway between the current location indicator position and the conceptual glyph boundary 940 has been crossed.

After either determining that movement of the touch input has not crossed a sub-region boundary, or performing the recalculation on account of moving the position indicator, the process determines (at 840) whether the touch contact remains uninterrupted. In some embodiments, once the user releases the touch input, the zoom tool is deactivated and the process ends. However, in some such embodiments, the process continues displaying the position indicator within the document text in order to indicate to the user the location at which text will be inserted into the document.

While this is shown as a determination (i.e., whether or not the touch contact remains uninterrupted) in the process 800, one of ordinary skill in the art will recognize that in some embodiments the zoom tool deactivation is event driven, in that the device displays the zoom tool and performs the position indicator movement and sub-region calculation until an event is received indicating that the touch input has been removed from the touchscreen display. Furthermore, one of ordinary skill in the art will recognize that all operations in the process 800 may not be performed in the exact order shown in the figure. For instance, the definition of the display screen sub-regions for a word (shown as three operations 815, 820, and 823) may be performed as parallel computations, rather than defining the three sets of sub-regions in a particular order as shown in FIG. 8.

Figure 10:
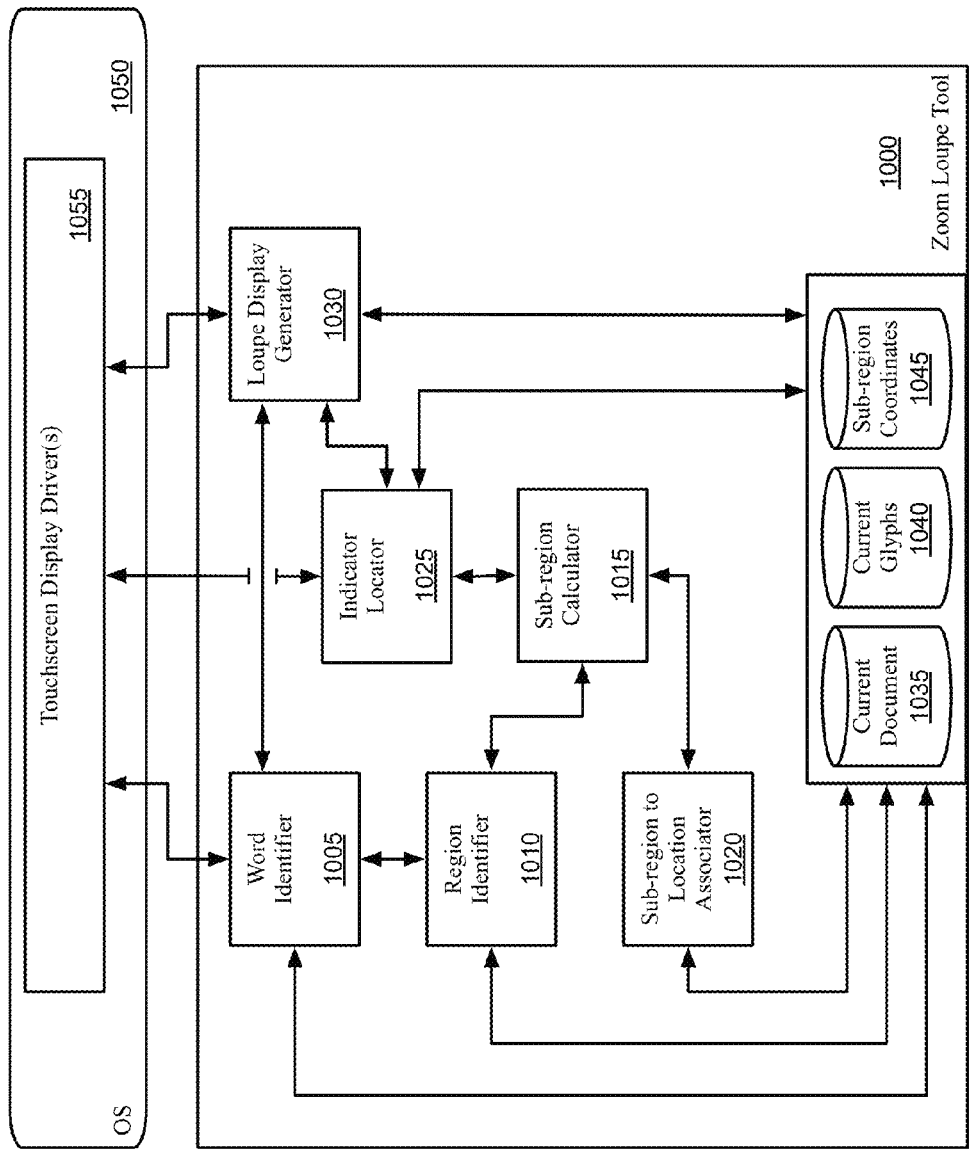
FIG. 10 conceptually illustrates the software architecture of a zoom loupe tool of some embodiments.

In some embodiments, the processes described above are implemented as software running on a particular machine, such as a smart phone, tablet, or other handheld device, computer, etc., and/or stored in a machine-readable medium. FIG. 10 conceptually illustrates the software architecture of a zoom loupe tool 1000 of some embodiments. In some embodiments, the zoom loupe tool is a stand-alone application or is integrated into another application (e.g., an e-mail application, a document editing application, etc.), while in other embodiments the tool might be implemented within an operating system.

The zoom loupe tool 1000 includes a word identifier 1005, a region identifier 1010, a sub-region calculator 1015, a sub-region to location associator 1020, an indicator locator 1025, and a loupe display generator 1030. The figure also illustrates stored data associated with the zoom loupe tool 1000: a currently display document 1035, current glyphs 1040, and sub-region coordinates 1045.

In some embodiments, the data 1035-1045 is stored in memory (e.g., RAM). That is, the current document is loaded into memory for display (though the document may also be stored in non-volatile memory for long-term storage as well), the zoom loupe tool stores the current set of glyphs in which a position indicator is located in memory, and also stores coordinates for the sub-regions associated with each of these glyphs in memory. Other embodiments may store this information in other storages (e.g., hard disk, solid-state storage, etc.), however.

FIG. 10 also illustrates an operating system 1050 that includes touchscreen display driver(s) 1055. In some embodiments, the zoom loupe tool 1000 is part of the operating system 1050, while in other embodiments the tool operates separate from (e.g., on top of) the operating system, while receiving information from and passing information to the touchscreen display driver(s) 1055.

The touchscreen display driver 1055, in some embodiments, translates signals from a touchscreen according to user interaction. A user interacts with the touchscreen display by touching the display (e.g., with one or more fingers, with a stylus, etc.). These touch inputs are translated by the display driver 1055 into gestures with location coordinates. For instance, inputs may be identified as a one-finger swipe, two-finger swipe, tap, press-and-hold, double tap, two-finger rotation, etc. These gestures, including the press-and-hold gesture, have associated coordinates of the touchscreen that are determined using heuristics that resolve a spread-out input of an object pressing on the display screen into a more precise location. This gesture and location information is provided by the touchscreen display driver 1055 to the word identifier 1005 and the position indicator locator 1025.

The present application describes a graphical user interface that provides users with numerous ways to perform different sets of operations and functionalities. In some embodiments, these operations and functionalities are performed based on different commands that are received from users through different types of touchscreen devices. For example, the present application illustrates the use of touchscreen input (e.g., with one or more fingers) to control (e.g., select, move) objects in the graphical user interface. However, in some embodiments, objects in the graphical user interface can also be controlled or manipulated through other controls, such as a cursor. In some embodiments, cursor control is implemented through an input device that moves a cursor to different locations on the display of the device. Based on the location of the cursor, different input (e.g., mouse button clicks, etc.) can be used to perform different actions (e.g., selection of a GUI item). Thus, while many of the figures above do not illustrate a cursor, some embodiments perform the same or similar actions with the use of a cursor (with or without touch control).

The touchscreen display driver 1055 additionally translates the output of the zoom loupe tool for display on the touchscreen. That is, the touchscreen display driver 1055 receives signals (e.g., from the loupe display generator 1030) describing how and where on the display the loupe should be displayed and translates these signals into pixel information that is sent to the touchscreen display. While shown as a single touchscreen driver 1055, in some embodiments the input translation and display translation aspects are separate modules within this driver, or are separate aspects of the OS 1050.

The word identifier 1005 of some embodiments receives location coordinates of a touch-down location for a press-and-hold operation that activates the zoom loupe. The word identifier uses these received from the touchscreen driver 1055 and information about the current document display retrieved from memory 1035 in order to correlate the location to a specific word within the document. The word identifier then stores the set of glyphs that make up this word in memory 1040.

The region identifier 1010 receives the current set of glyphs, either from the word identifier 1005 or from the memory 1040, and associates a region of the touchscreen with the set of glyphs. In some embodiments, the associated region of the touchscreen is a set of location coordinates of the touchscreen. The region identifier passes the region information for the current set of glyphs to the division calculator 1015.

The sub-region calculator 1015 uses information about the specific set of glyphs (e.g., width information), as well as the region coordinates received from the region identifier 1010 in order to divide the region into sub-regions for each boundary between the glyphs (as well as at the edges of the first and last glyphs). Furthermore, for embodiments in which the zoom loupe tool divides a word's display screen region into sub-regions based on the location of the position indicator (e.g., as shown in FIG. 6), the location within the set of glyphs of the position indicator is received from the indicator locator 1025. The division calculator 1015 computes coordinates for the sub-regions and stores these in memory 1045.

The sub-region to location associator 1020 associates each location between two of the current glyphs 1040 with sub-region coordinates 1045. In some embodiments, the sub-region to location associator 1020 creates links in memory between the data stored in memory 1040 and the data stored in memory 1045. Some embodiments perform this association based on the order of the glyphs and the order of the sets of coordinates (i.e., by assigning the region with the lowest x-coordinates to the leftmost glyph boundary).

The location indicator 1025 receives the touchscreen input to activate the zoom loupe, causing an initial identification of the location of the position indicator. In some embodiments, the location indicator 1025 uses the information about the current document 1030 to translate the location coordinates of the initial input into a location between two glyphs in the document. In addition, as touch input movement is received from the touchscreen driver 1055, the indicator locator uses the sub-region coordinates 1045 to determine when to move the position indicator to a new location. The location indicator 1025 sends the position indicator location to the loupe display generator 1030 in some embodiments, for incorporation into the zoom loupe.

The loupe display generator 1030 sends zoom loupe display information to the touchscreen display driver 1055 in order for the device to display a zoom loupe, with a position indicator, in the appropriate location on the display screen. In some embodiments, the loupe display generator 1030 uses the current document display information, as well as the identified current word within the document, in order to determine the portion of the document that should be magnified within the zoom loupe. The loupe display generator then incorporates the position indicator into this magnified display, applies any loupe display effects (e.g., effects at the edge of the loupe), and sends the display information (including a location at which to display the loupe) to the touchscreen display driver 1055.

While many of the features of the zoom loupe tool 1000 have been described as being performed by one module (e.g., the loupe display generator 1030), one of ordinary skill in the art will recognize that the functions described herein might be split up into multiple modules. Similarly, functions described as being performed by multiple different modules might be performed by a single module in some embodiments (e.g., the word identifier 1005 and region identifier 1010 might be part of a single module). Furthermore, while these operations are described as being performed by a zoom loupe tool, in some embodiments the sub-region calculation and position indicator location functions are performed for a different type of zoom tool, for location of the position indicator in a document without a zoom function, etc.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
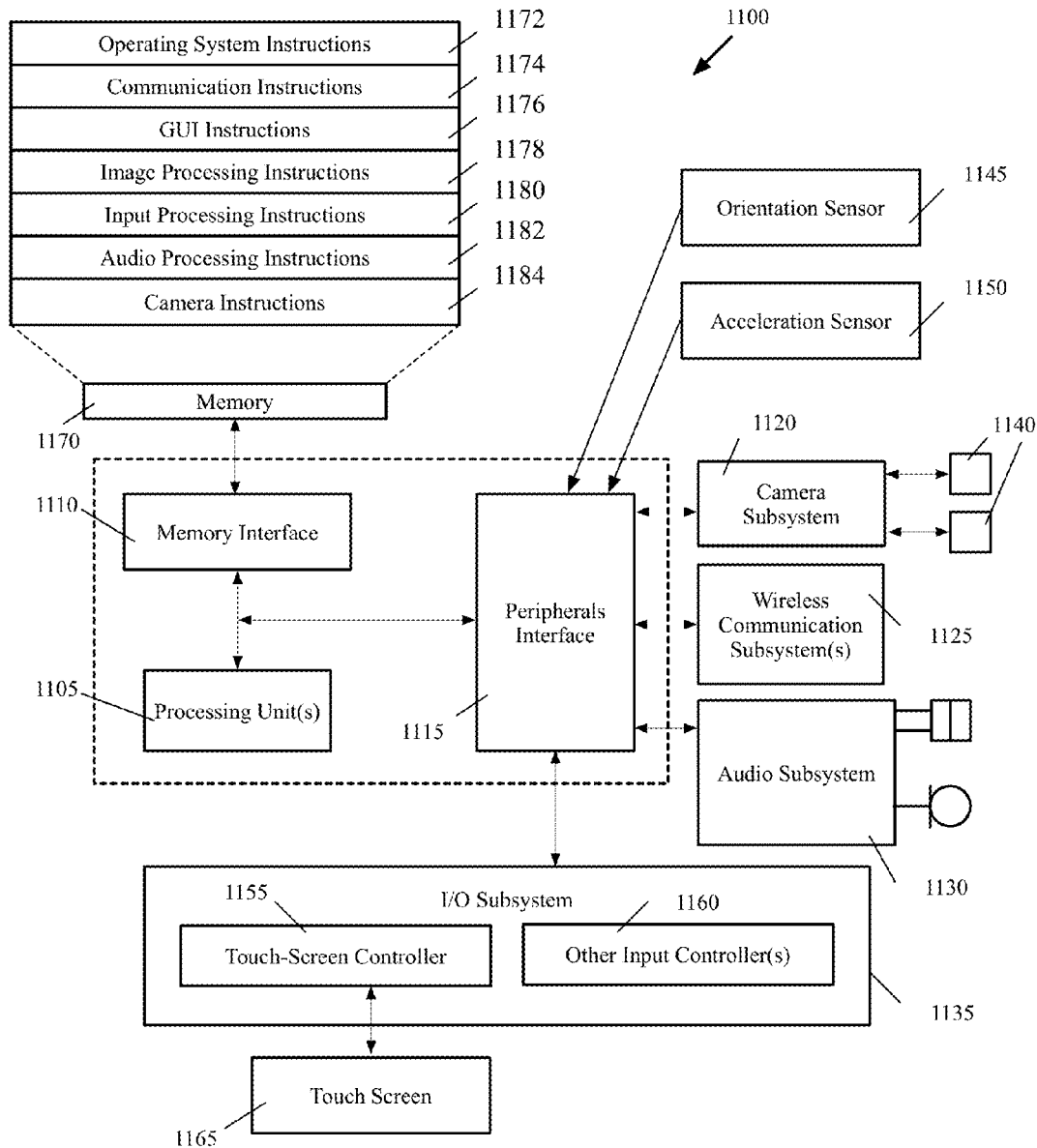
FIG. 11 illustrates an example of an architecture 1100 of a mobile computing device with which some embodiments are implemented.

The zoom and position indicator tools of some embodiments operate on mobile devices, such as smart phones (e.g., iPhones®) and tablets (e.g., iPads®). FIG. 11 is an example of an architecture 1100 of such a mobile computing device. Examples of mobile computing devices include smartphones, tablets, laptops, etc. As shown, the mobile computing device 1100 includes one or more processing units 1105, a memory interface 1110 and a peripherals interface 1115.

The peripherals interface 1115 is coupled to various sensors and subsystems, including a camera subsystem 1120, a wireless communication subsystem(s) 1125, an audio subsystem 1130, an I/O subsystem 1135, etc. The peripherals interface 1115 enables communication between the processing units 1105 and various peripherals. For example, an orientation sensor 1145 (e.g., a gyroscope) and an acceleration sensor 1150 (e.g., an accelerometer) is coupled to the peripherals interface 1115 to facilitate orientation and acceleration functions.

The camera subsystem 1120 is coupled to one or more optical sensors 1140 (e.g., a charged coupled device (CCD) optical sensor, a complementary metal-oxide-semiconductor (CMOS) optical sensor, etc.). The camera subsystem 1120 coupled with the optical sensors 1140 facilitates camera functions, such as image and/or video data capturing. The wireless communication subsystem 1125 serves to facilitate communication functions. In some embodiments, the wireless communication subsystem 1125 includes radio frequency receivers and transmitters, and optical receivers and transmitters (not shown in FIG. 11). These receivers and transmitters of some embodiments are implemented to operate over one or more communication networks such as a GSM network, a Wi-Fi network, a Bluetooth network, etc. The audio subsystem 1130 is coupled to a speaker to output audio (e.g., to output voice navigation instructions). Additionally, the audio subsystem 1130 is coupled to a microphone to facilitate voice-enabled functions, such as voice recognition (e.g., for searching), digital recording, etc.

The I/O subsystem 1135 involves the transfer between input/output peripheral devices, such as a display, a touch screen, etc., and the data bus of the processing units 1105 through the peripherals interface 1115. The I/O subsystem 1135 includes a touch-screen controller 1155 and other input controllers 1160 to facilitate the transfer between input/output peripheral devices and the data bus of the processing units 1105. As shown, the touch-screen controller 1155 is coupled to a touch screen 1165. The touch-screen controller 1155 detects contact and movement on the touch screen 1165 using any of multiple touch sensitivity technologies. The other input controllers 1160 are coupled to other input/control devices, such as one or more buttons. Some embodiments include a near-touch sensitive screen and a corresponding controller that can detect near-touch interactions instead of or in addition to touch interactions.

The memory interface 1110 is coupled to memory 1170. In some embodiments, the memory 1170 includes volatile memory (e.g., high-speed random access memory), non-volatile memory (e.g., flash memory), a combination of volatile and non-volatile memory, and/or any other type of memory. As illustrated in FIG. 11, the memory 1170 stores an operating system (OS) 1172. The OS 1172 includes instructions for handling basic system services and for performing hardware dependent tasks.

The memory 1170 also includes communication instructions 1174 to facilitate communicating with one or more additional devices; graphical user interface instructions 1176 to facilitate graphic user interface processing; image processing instructions 1178 to facilitate image-related processing and functions; input processing instructions 1180 to facilitate input-related (e.g., touch input) processes and functions; audio processing instructions 1182 to facilitate audio-related processes and functions; and camera instructions 1184 to facilitate camera-related processes and functions. The instructions described above are merely exemplary and the memory 1170 includes additional and/or other instructions in some embodiments. For instance, the memory for a smartphone may include phone instructions to facilitate phone-related processes and functions. Additionally, the memory may include instructions for a zoom tool, document editing processes, etc. The above-identified instructions need not be implemented as separate software programs or modules. Various functions of the mobile computing device can be implemented in hardware and/or in software, including in one or more signal processing and/or application specific integrated circuits.

While the components illustrated in FIG. 11 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 11 may be split into two or more integrated circuits.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such machine-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The machine-readable media may store a program that is executable by at least one processing unit and includes sets of instructions for performing various operations. Examples of programs or code include machine code, such as is produced by a compiler, and files including higher-level code that are executed by a computer, an electronic component, or a microprocessor using an interpreter.

While the above discussion refers in part to microprocessor or multi-core processors that execute software, some embodiments are performed by one or more integrated circuits, such as application specific integrated circuits (ASICs), customized ASICs or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, some of the figures illustrate various touch gestures (e.g., press and hold gestures, touch movements, etc.). However, many of the illustrated operations could be performed via different touch gestures (e.g., a tap rather than a press-and-hold, etc.) or by non-touch input (e.g., using a cursor controller, a keyboard, a touchpad/trackpad, a near-touch sensitive screen, etc.). In addition, a number of the figures (including FIGS. 4 and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method, comprising:
    at an electronic device with a touch screen display:
        displaying a document comprising a plurality of glyphs on the touch screen display;
        receiving a touch input on the touch screen display to activate a zoom tool enabling location of a position indicator within a set of associated glyphs of the document, wherein:
            the set of associated glyphs divides a touch screen region into a set of sub-regions,
            each sub-region is associated with a position indicator location between two adjacent glyphs in the set of associated glyphs,
            a first sub-region associated with a location between first and second glyphs has a same width as a second sub-region associated with a location between the second glyph and a third glyph, and the first and third glyphs do not have an equal width; and
        correlating movement of the touch input across the touch screen display with the equally-spaced sub-regions in order to move the position indicator between the glyphs in the associated set.

2. The method of claim 1, wherein the set of associated glyphs is a word of the document.

3. The method of claim 1, wherein the set of associated glyphs comprises glyphs of a word in which the position indicator is located that appear to one side of the position indicator location in the word.

4. The method of claim 3, wherein the set of associated glyphs is a first set and the set of sub-regions is a first set of sub-regions of a first touch screen region, and the method further comprises automatically dividing a second touch screen region for a second set of associated glyphs into a second set of sub-regions, wherein:
    a third sub-region associated with a location between fourth and fifth glyphs in the second set of sub-regions has a same width as a fourth sub-region associated with a location between the fifth glyph and a sixth glyph,
    the fourth and sixth glyphs do not have an equal width,
    the width of the first and second sub-regions is different than the width of the third and fourth sub-regions, and
    the second set of associated glyphs comprises characters of the word in which the position indicator is located that appear after the position indicator location.

5. The method of claim 1, wherein the touch screen region for the set of associated glyphs is divided into the set of sub-regions by:
    identifying (i) a number of glyphs in the set of associated glyphs and (ii) a total width of the set of associated glyphs;
    dividing the total width by the number of glyphs to calculate a distance between equally-spaced conceptual glyph boundaries;
    defining sub-region boundaries at midpoints between the conceptual glyph boundaries; and
    associating each particular position indicator location between two adjacent glyphs in the set with a particular sub-region between two of the defined sub-region boundaries.

6. The method of claim 5, further comprising:
    defining a sub-region associated with a position indicator location before a first glyph in the set; and
    defining a sub-region associated with a position indicator location after a last glyph in the set.

7. The method of claim 1, wherein the document is an editable document and the position indicator is an insertion marker that indicates where a user may insert or delete text in the document.

8. The method of claim 1, wherein the touch input comprises a single uninterrupted touch contact on the touch screen display over the set of associated glyphs.

9. The method of claim 1, wherein dividing of the touch screen region into the set of sub-regions is performed dynamically upon receiving the touch input to activate the zoom tool.

10. The method of claim 1, wherein the touch input is initially located within the first sub-region and the position indicator is located between the first and second glyphs, wherein correlating movement of the touch input comprises:
  receiving a movement of the touch input from the first sub-region to the second sub-region; and
  in response to the movement of the touch input, moving the position indicator to the location between the second and third glyphs.

11. A method, comprising:
  at an electronic device with a touch screen display:
    displaying editable text on the touch screen display;
    receiving a touch input on the touch screen display to activate an editing tool that enables placement of an insertion marker between two characters within a text region of the editable text, wherein
    each location between two characters in the text region is associated with an equally-sized area of the touch screen display; and,
    when the touch input moves from a first one of the equally-sized areas of the touch screen display to a second one of the equally-sized areas of the touch screen display, moving the insertion marker from a first location between a first character in the text region and a second character in the text region to a second location between the second character and a third character in the text region.

12. The method of claim 11, further comprising:
  receiving input to edit the text region; and
  automatically associating each location between two characters in the edited text region with a new equally-sized area of the touch screen display.

13. The method of claim 12, wherein the size of the new areas are different than the size of the areas before receiving the edit.

14. The method of claim 12, wherein the edit comprises deletion of a text character from the text region.

15. The method of claim 12, wherein the edit comprises insertion of a text character in the text region.

16. The method of claim 11, wherein a size of each equally-sized area is based on a total size of the text region divided by a number of characters in the text region.

17. The method of claim 11, further comprising associating a location prior to a first character in the text region with a differently-sized area of the touch screen display.

18. The method of claim 11, further comprising associating a location after a last character in the text region with a differently-sized area of the touch screen display.

19. A method, comprising:
  at an electronic device with a touch screen display:
    based on a current location of a position indicator within a set of associated glyphs displayed on the touch screen display, assigning sections of the touch screen display to each of the locations between glyphs in the set;
    receiving touch input moving from a first section of the touch screen display to a second section of the touch screen display in order to move the position indicator to a new location within the set of associated glyphs; and
    dynamically modifying a size of at least one of the sections based on the new location of the position indicator.

20. The method of claim 19, wherein the set of associated glyphs is a word and assigning sections of the touch screen display to each of the glyphs in the word comprises:
  for each of the locations between two glyphs to the left of the current location of the position indicator, calculating an initial size of the assigned sections by dividing a total size of the glyphs to the left of the position indicator by a number of glyphs to the left of the position indicator; and
  for each of the locations between two glyphs to the right of the current location of the position indicator, calculating an initial size of the assigned sections by dividing a total size of the glyphs to the right of the position indicator by a number of glyphs to the right of the position indicator.

21. The method of claim 20, wherein dynamically modifying the size of at least one section comprises updating the calculations for locations between two glyphs to a first side of the position indicator based on at least one glyph moving from a second side of the position indicator to the first side of the position indicator.

22. The method of claim 19, further comprising displaying, around the position indicator, a zoom loupe that magnifies the set of associated glyphs and surrounding text.

23. A non-transitory computer readable storage medium storing one or more programs, the one or more programs comprising instructions, which when executed by an electronic device with a touch screen display, cause the electronic device to:
  display a document comprising a plurality of glyphs on the touch screen display;
  receive a touch input on the touch screen display to activate a zoom tool enabling location of a position indicator within a set of associated glyphs of the document, wherein:
    the set of associated glyphs divides a touch screen region into a set of sub-regions,
    each sub-region is associated with a position indicator location between two adjacent glyphs in the set of associated glyphs,
    a first sub-region associated with a location between first and second glyphs has a same width as a second sub-region associated with a location between the second glyph and a third glyph, and
    the first and third glyphs do not have an equal width; and
  correlate movement of the touch input across the touch screen display with the equally-spaced sub-regions in order to move the position indicator between the glyphs in the associated set.

24. The computer readable storage medium of claim 23, wherein the set of associated glyphs is a word of the document.

25. The computer readable storage medium of claim 23, wherein the set of associated glyphs comprises glyphs of a word in which the position indicator is located that appear to one side of the position indicator location in the word.

26. The computer readable storage medium of claim 25, wherein the set of associated glyphs is a first set and the set of sub-regions is a first set of sub-regions of a first touch screen region, and the computer readable storage medium includes instructions, which when executed by the electronic device with the touch screen display, cause the electronic device to:
  automatically divide a second touch screen region for a second set of associated glyphs into a second set of sub-regions, wherein:
    a third sub-region associated with a location between fourth and fifth glyphs in the second set of sub-regions has a same width as a fourth sub-region associated with a location between the fifth glyph and a sixth glyph, the fourth and sixth glyphs do not have an equal width, the width of the first and second sub-regions is different than the width of the third and fourth sub-regions, and the second set of associated glyphs comprises characters of the word in which the position indicator is located that appear after the position indicator location.

27. The computer readable storage medium of claim 23, wherein the touch screen region for the set of associated glyphs is divided into the set of sub-regions by:

identifying (i) a number of glyphs in the set of associated glyphs and (ii) a total width of the set of associated glyphs;

dividing the total width by the number of glyphs to calculate a distance between equally-spaced conceptual glyph boundaries;

defining sub-region boundaries at midpoints between the conceptual glyph boundaries; and associating each particular position indicator location between two adjacent glyphs in the set with a particular sub-region between two of the defined sub-region boundaries.

28. The computer readable storage medium of claim 27, including instructions, which when executed by the electronic device with the touch screen display, cause the electronic device to:

define a sub-region associated with a position indicator location before a first glyph in the set; and define a sub-region associated with a position indicator location after a last glyph in the set.

29. The computer readable storage medium of claim 23, wherein the document is an editable document and the position indicator is an insertion marker that indicates where a user may insert or delete text in the document.

30. The computer readable storage medium of claim 23, wherein the touch input comprises a single uninterrupted touch contact on the touch screen display over the set of associated glyphs.

31. The computer readable storage medium of claim 23, wherein dividing of the touch screen region into the set of sub-regions is performed dynamically upon receiving the touch input to activate the zoom tool.

32. The computer readable storage medium of claim 23, wherein the touch input is initially located within the first sub-region and the position indicator is located between the first and second glyphs, wherein correlating movement of the touch input comprises:

receiving a movement of the touch input from the first sub-region to the second sub-region; and in response to the movement of the touch input, moving the position indicator to the location between the second and third glyphs.

33. An electronic device, comprising:
a touch screen display;
one or more processors; and
memory storing one or more programs for execution by the one or more processors, the one or more programs including instructions for:
displaying a document comprising a plurality of glyphs on the touch screen display;

receiving a touch input on the touch screen display to activate a zoom tool enabling location of a position indicator within a set of associated glyphs of the document, wherein:

the set of associated glyphs divides a touch screen region into a set of sub-regions, each sub-region is associated with a position indicator location between two adjacent glyphs in the set of associated glyphs, a first sub-region associated with a location between first and second glyphs has a same width as a second sub-region associated with a location between the second glyph and a third glyph, and the first and third glyphs do not have an equal width; and correlating movement of the touch input across the touch screen display with the equally-spaced sub-regions in order to move the position indicator between the glyphs in the associated set.

34. The electronic device of claim 33, wherein the set of associated glyphs is a word of the document.

35. The electronic device of claim 33, wherein the set of associated glyphs comprises glyphs of a word in which the position indicator is located that appear to one side of the position indicator location in the word.

36. The electronic device of claim 35, wherein the set of associated glyphs is a first set and the set of sub-regions is a first set of sub-regions of a first touch screen region, and the electronic device includes instructions for:

automatically dividing a second touch screen region for a second set of associated glyphs into a second set of sub-regions, wherein:

a third sub-region associated with a location between fourth and fifth glyphs in the second set of sub-regions has a same width as a fourth sub-region associated with a location between the fifth glyph and a sixth glyph, the fourth and sixth glyphs do not have an equal width, the width of the first and second sub-regions is different than the width of the third and fourth sub-regions, and the second set of associated glyphs comprises characters of the word in which the position indicator is located that appear after the position indicator location.

37. The electronic device of claim 33, wherein the touch screen region for the set of associated glyphs is divided into the set of sub-regions by:

identifying (i) a number of glyphs in the set of associated glyphs and (ii) a total width of the set of associated glyphs;

dividing the total width by the number of glyphs to calculate a distance between equally-spaced conceptual glyph boundaries;

defining sub-region boundaries at midpoints between the conceptual glyph boundaries; and associating each particular position indicator location between two adjacent glyphs in the set with a particular sub-region between two of the defined sub-region boundaries.

38. The electronic device of claim 37, including instructions for:

defining a sub-region associated with a position indicator location before a first glyph in the set; and defining a sub-region associated with a position indicator location after a last glyph in the set.

39. The electronic device of claim 33, wherein the document is an editable document and the position indicator is an insertion marker that indicates where a user may insert or delete text in the document.

40. The electronic device of claim 33, wherein the touch input comprises a single uninterrupted touch contact on the touch screen display over the set of associated glyphs.

41. The electronic device of claim 33, wherein dividing of the touch screen region into the set of sub-regions is performed dynamically upon receiving the touch input to activate the zoom tool.

42. The electronic device of claim 33, wherein the touch input is initially located within the first sub-region and the position indicator is located between the first and second glyphs, wherein correlating movement of the touch input comprises:
  receiving a movement of the touch input from the first sub-region to the second sub-region; and
  in response to the movement of the touch input, moving the position indicator to the location between the second and third glyphs.

43. A non-transitory computer readable storage medium storing one or more programs, the one or more programs comprising instructions, which when executed by an electronic device with a touch screen display, cause the electronic device to:
  display editable text on the touch screen display;
  receive a touch input on the touch screen display to activate an editing tool that enables placement of an insertion marker between two characters within a text region of the editable text, wherein each location between two characters in the text region is associated with an equally-sized area of the touch screen display; and,
  when the touch input moves from a first one of the equally-sized areas of the touch screen display to a second one of the equally-sized areas of the touch screen display, move the insertion marker from a first location between a first character in the text region and a second character in the text region to a second location between the second character and a third character in the text region.

44. The computer readable storage medium of claim 43, including instructions, which when executed by the electronic device with the touch screen display, cause the electronic device to:
  receive input to edit the text region; and
  automatically associate each location between two characters in the edited text region with a new equally-sized area of the touch screen display.

45. The computer readable storage medium of claim 44, wherein the size of the new areas are different than the size of the areas before receiving the edit.

46. The computer readable storage medium of claim 44, wherein the edit comprises deletion of a text character from the text region.

47. The computer readable storage medium of claim 44, wherein the edit comprises insertion of a text character in the text region.

48. The computer readable storage medium of claim 43, wherein a size of each equally-sized area is based on a total size of the text region divided by a number of characters in the text region.

49. The computer readable storage medium of claim 43, including instructions, which when executed by the electronic device with the touch screen display, cause the electronic device to:
  associate a location prior to a first character in the text region with a differently-sized area of the touch screen display.

50. The computer readable storage medium of claim 43, including instructions, which when executed by the electronic device with the touch screen display, cause the electronic device to:
  associate a location after a last character in the text region with a differently-sized area of the touch screen display.

51. An electronic device, comprising:
  a touch screen display;
  one or more processors; and
  memory storing one or more programs for execution by the one or more processors, the one or more programs including instructions for:
    displaying editable text on the touch screen display;
    receiving a touch input on the touch screen display to activate an editing tool that enables placement of an insertion marker between two characters within a text region of the editable text, wherein each location between two characters in the text region is associated with an equally-sized area of the touch screen display; and,
    when the touch input moves from a first one of the equally-sized areas of the touch screen display to a second one of the equally-sized areas of the touch screen display, moving the insertion marker from a first location between a first character in the text region and a second character in the text region to a second location between the second character and a third character in the text region.

52. The electronic device of claim 51, including instructions for:
  receiving input to edit the text region; and
  automatically associating each location between two characters in the edited text region with a new equally-sized area of the touch screen display.

53. The electronic device of claim 52, wherein the size of the new areas are different than the size of the areas before receiving the edit.

54. The electronic device of claim 52, wherein the edit comprises deletion of a text character from the text region.

55. The electronic device of claim 52, wherein the edit comprises insertion of a text character in the text region.

56. The electronic device of claim 51, wherein a size of each equally-sized area is based on a total size of the text region divided by a number of characters in the text region.

57. The electronic device of claim 51, including instructions for:
  associating a location prior to a first character in the text region with a differently-sized area of the touch screen display.

58. The electronic device of claim 51, including instructions for:
  associating a location after a last character in the text region with a differently-sized area of the touch screen display.

59. A non-transitory computer readable storage medium storing one or more programs, the one or more programs comprising instructions, which when executed by an electronic device with a touch screen display, cause the electronic device to:
  based on a current location of a position indicator within a set of associated glyphs displayed on the touch screen display, assign sections of the touch screen display to each of the locations between glyphs in the set;

receive touch input moving from a first section of the touch screen display to a second section of the touch screen display in order to move the position indicator to a new location within the set of associated glyphs; and dynamically modify a size of at least one of the sections based on the new location of the position indicator.

60. The computer readable storage medium of claim 59, wherein the set of associated glyphs is a word and assigning sections of the touch screen display to each of the glyphs in the word comprises:

for each of the locations between two glyphs to the left of the current location of the position indicator, calculating an initial size of the assigned sections by dividing a total size of the glyphs to the left of the position indicator by a number of glyphs to the left of the position indicator; and for each of the locations between two glyphs to the right of the current location of the position indicator, calculating an initial size of the assigned sections by dividing a total size of the glyphs to the right of the position indicator by a number of glyphs to the right of the position indicator.

61. The computer readable storage medium of claim 60, wherein dynamically modifying the size of at least one section comprises updating the calculations for locations between two glyphs to a first side of the position indicator based on at least one glyph moving from a second side of the position indicator to the first side of the position indicator.

62. The computer readable storage medium of claim 59, including instructions, which when executed by the electronic device with the touch screen display, cause the electronic device to display, around the position indicator, a zoom loupe that magnifies the set of associated glyphs and surrounding text.

63. An electronic device, comprising:
a touch screen display;
one or more processors; and
memory storing one or more programs for execution by the one or more processors, the one or more programs including instructions for:

based on a current location of a position indicator within a set of associated glyphs displayed on the touch screen display, assigning sections of the touch screen display to each of the locations between glyphs in the set;

receiving touch input moving from a first section of the touch screen display to a second section of the touch screen display in order to move the position indicator to a new location within the set of associated glyphs; and dynamically modifying a size of at least one of the sections based on the new location of the position indicator.

64. The electronic device of claim 63, wherein the set of associated glyphs is a word and assigning sections of the touch screen display to each of the glyphs in the word comprises:

for each of the locations between two glyphs to the left of the current location of the position indicator, calculating an initial size of the assigned sections by dividing a total size of the glyphs to the left of the position indicator by a number of glyphs to the left of the position indicator; and for each of the locations between two glyphs to the right of the current location of the position indicator, calculating an initial size of the assigned sections by dividing a total size of the glyphs to the right of the position indicator by a number of glyphs to the right of the position indicator.

65. The electronic device of claim 64, wherein dynamically modifying the size of at least one section comprises updating the calculations for locations between two glyphs to a first side of the position indicator based on at least one glyph moving from a second side of the position indicator to the first side of the position indicator.

66. The electronic device of claim 63, including instructions for displaying, around the position indicator, a zoom loupe that magnifies the set of associated glyphs and surrounding text.

* * * * *